(12) United States Patent
Krasniewicz et al.

(10) Patent No.: US 9,527,263 B2
(45) Date of Patent: Dec. 27, 2016

(54) STAIN PROOF TEXTURED FABRIC

(71) Applicant: Apple Inc., Cupertino, CA (US)

(72) Inventors: Brett E. Krasniewicz, Santa Clara, CA (US); Yoji Hamada, Wakayama (JP)

(73) Assignee: Apple Inc., Cupertino, CA (US)

( * ) Notice: Subject to any disclaimer, the term of this patent is extended or adjusted under 35 U.S.C. 154(b) by 478 days.

(21) Appl. No.: 14/168,990

(22) Filed: Jan. 30, 2014

(65) Prior Publication Data

US 2015/0210033 A1 Jul. 30, 2015

(51) Int. Cl.
| | |
|---|---|
| *B32B 3/30* | (2006.01) |
| *B32B 7/12* | (2006.01) |
| *B32B 27/40* | (2006.01) |
| *B32B 38/10* | (2006.01) |
| *B32B 37/12* | (2006.01) |
| *B32B 37/24* | (2006.01) |
| *B32B 37/26* | (2006.01) |
| *B32B 38/00* | (2006.01) |
| *B32B 5/02* | (2006.01) |
| *B32B 27/12* | (2006.01) |
| *B32B 38/06* | (2006.01) |
| *B32B 27/32* | (2006.01) |

(52) U.S. Cl.
CPC . *B32B 3/30* (2013.01); *B32B 5/02* (2013.01); *B32B 5/026* (2013.01); *B32B 7/12* (2013.01); *B32B 27/12* (2013.01); *B32B 27/322* (2013.01); *B32B 38/06* (2013.01); *B32B 37/12* (2013.01); *B32B 2037/243* (2013.01); *B32B 2038/0028* (2013.01); *B32B 2255/10* (2013.01); *B32B 2255/26* (2013.01); *B32B 2305/18* (2013.01); *B32B 2327/18* (2013.01); *B32B 2451/00* (2013.01); *Y10T 156/10* (2015.01); *Y10T 428/24355* (2015.01)

(58) Field of Classification Search
CPC ............... B32B 3/30; B32B 5/02; B32B 7/12; B32B 27/12; B32B 5/026; B32B 37/12; B32B 2255/26; B32B 2037/243; B32B 2038/0028; B32B 2451/00; B32B 38/06; B32B 2305/18; B32B 2327/18; B32B 27/322; B32B 2255/10; Y10T 428/24355; Y10T 156/10
USPC ........................................................ 156/246
See application file for complete search history.

(56) References Cited

U.S. PATENT DOCUMENTS

2002/0076534 A1* 6/2002 Sadato ............... A41D 31/0016
428/206

* cited by examiner

*Primary Examiner* — Philip Tucker
*Assistant Examiner* — Vicki Wu
(74) *Attorney, Agent, or Firm* — Joseph F. Guihan (57) ABSTRACT

This application relates to a method and apparatus for forming a textured stain resistant fabric. The stain resistant layer can be formed from a non-conventional anti-stain resistant resin that can conform to varying texturing geometries. In one embodiment, the stain resistant layer can be formed against a sheet of release paper having a texturing surface configured to form a textured surface on the stain resistant layer.

14 Claims, 6 Drawing Sheets

STAIN PROOF TEXTURED FABRIC

FIELD

The described embodiments relate generally to surface cosmetics. More particularly, the present embodiments relate to ways of adding a stain proof resin layer to a plastic cosmetic surface without adversely affecting a cosmetic look and feel of the surface.

BACKGROUND

Polyurethane resin can be utilized to create a cosmetic surface for any number of soft good products. In some applications, a textured feel can be applied to a polyurethane layer to create a pleasing texture having a matte finish. Unfortunately, polyurethane can be susceptible to staining from any number of compounds. Furthermore, application of a stain proofing layer by spraying, rolling or wet bath can cause an outside surface of the textured polyurethane layer generally results in the surface taking on a hard and/or shiny look and feel. This is caused by properties of the stain proofing layer that cause it to fill in texturing patterns of the polyurethane.

Therefore, what is desired is a way to improve stain resistance in a polyurethane cosmetic surface without adversely affecting cosmetic surface characteristics of the polyurethane.

SUMMARY

This paper describes various embodiments that relate to a textured, stain resistant apparatus and method for forming the same.

In a first embodiment, a method for forming a polyurethane fabric is disclosed. The method includes at least the following steps: forming a stain resistant layer by applying an anti-stain resistant resin to a sheet of release paper, the formed stain resistant layer including a first surface and a second surface opposite the first surface, the first surface having a textured pattern corresponding to a texturing pattern of the release paper; curing a polyurethane layer against the second surface of the stain resistant layer; applying an adhesive layer to the cured polyurethane layer; and laminating a textile layer against the adhesive layer.

In another embodiment a composite fabric is disclosed. The composite fabric includes at least the following elements: a stain resistant layer formed from an anti-stain resistant resin having a textured pattern disposed on a first surface of the stain resistant layer, the textured pattern providing a matte appearance and soft tactile feel to the stain resistant fabric; a polyurethane layer formed against a second surface of the stain resistant layer, the second surface being opposite the first surface; and a textile layer adhesively laminated to the polyurethane layer. The textured pattern of the first surface is complementary to a texturing pattern utilized by a texturing mechanism.

In yet another embodiment a method for forming an accessory device is disclosed. The method includes at least the following steps: depositing an anti-stain resistant resin against a sheet of release paper; solidifying the anti-stain resistant resin to form a stain resistant layer, the stain resistant layer comprising a first surface and a second surface opposite the first surface, the first surface having a textured pattern corresponding to a texturing pattern of the release paper; forming a polyurethane layer against the second surface of the stain resistant layer; curing the polyurethane layer; and laminating a textile layer against the polyurethane layer using an adhesive layer to form a composite fabric.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Composite substrates can be utilized to manufacture any number of soft good products. For example, polyurethane can be overlaid on a textile layer to form a cosmetic surface having a soft touch feel and a matte appearance. The soft touch feeling and matte appearance can be created by applying a texture, or series of ridges or bumps to the cosmetic surface. Texturing the cosmetic surface can be accomplished in a number of ways including, for example, forming the polyurethane against a sheet of release paper having a texturing pattern, or feeding the polyurethane through an embossing roller. Unfortunately, a bare polyurethane layer can be susceptible to staining Conventional stain-proofing layers have been applied topically through spray, roller or wet bath processes. Utilizing these processes results in the stain proofing material filling in and smoothing over any textured features formed along the polyurethane sheet As a result, the coating applied to the textured surface of the polyurethane layer can profoundly changes surface characteristics of the cosmetic surface from having a soft feeling and a matte appearance, to having a hard feeling with a shiny appearance. As a result, maintaining cosmetic characteristics of a textured surface when applying a stain proof layer or coating has been problematic.

One solution to this problem begins by applying an anti-stain resistant resin to a sheet of release paper. The anti-stain resistant resin can be solidified against the sheet of release paper to form a stain proofing layer. A texturing pattern disposed on the release paper causes the stain proofing layer to form a textured pattern as the anti-stain resistant resin solidifies against the release paper; in this way, the formed textured pattern assumes a geometry substantially complementary to the texturing pattern of the release paper. Subsequent to the stain proofing layer solidifying against the release paper a polyurethane layer or layers can be applied along with various adhesive and textile layers to form a textured stain resistant fabric. Once the fabric is fully formed, the sheet of release paper can be removed to reveal the textured pattern of the stain proofing layer. The release paper can include various chemical coatings to facilitate separation between the release paper and the stain proofing layer. In this way, the texture of the stain proofing layer can remain substantially intact while the release paper is removed from the stain proofing layer.

In another embodiment, the texturing pattern can be applied to the stain proofing layer by running it through an embossing roller. In such a case, the fabric can be constructed in a more traditional manner, in some cases applying the stain proofing layer after the other fabric layers are assembled. The stain proofing layer can be formed of a resin having material properties allowing an embossing roller to apply a complex texture to along the stain proofing layer.

Unfortunately, in some embodiments, conventional stain proofing compounds may not be well adapted for use in the aforementioned configurations. For example, conventional stain proofing chemistries, such as fluoroalkyl C6 chemistries, have high viscosities preventing them from taking on certain textures that may be desirable to achieve a particular tactile or visual characteristic. Furthermore, stain proofing chemistries tend to be susceptible to hydrolysis and do not easily accept pigment additives. Consequently, in some embodiments, for optimal employment of the described embodiments a non-conventional stain proofing compound can be employed to form the stain proofing layer. Anti-stain proof resin used to form the stain proofing layer can be formed from a copolymer having a number of different elements that give the anti-stain resistant resin the following attributes: solvent solubility and the ability to adjust viscosity for film formulation and texturing; stability against hydrolytic attack; and pigment dispersion. More specific examples of such a compound will be discussed in more detail below. It should be noted that chemistry of the anti-stain resistant resin can be modified to achieve a desired tactile and/or visual characteristic.

These and other embodiments are discussed below with reference to FIGS. 1A-6; however, those skilled in the art will readily appreciate that the detailed description given herein with respect to these figures is for explanatory purposes only and should not be construed as limiting.

Figure 1A:
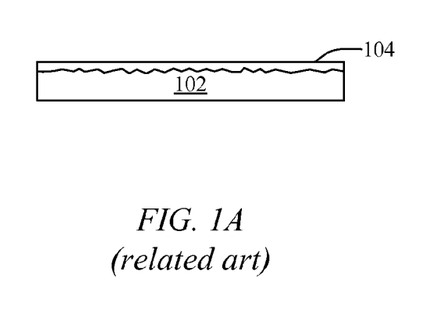
FIGS. 1A-1E show a series of steps for forming a stain proofed polyurethane fabric.
Figure 1B:
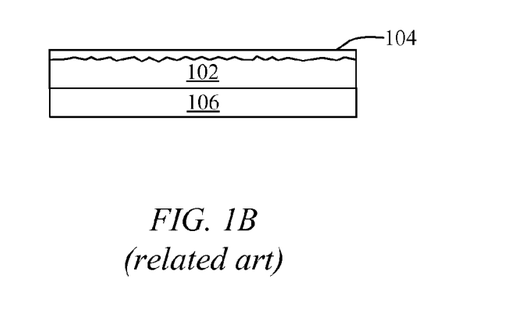
Figure 1C:
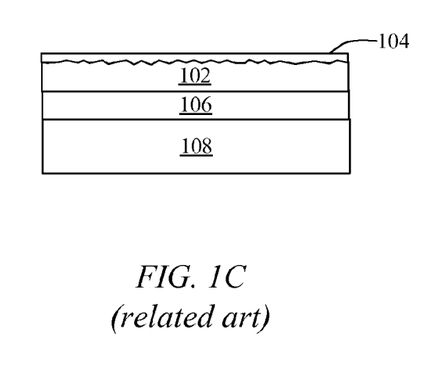
Figure 1D:
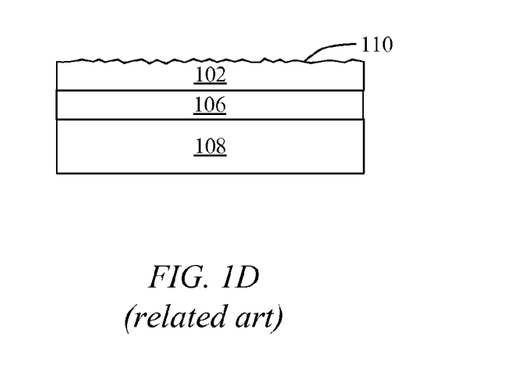
Figure 1E:
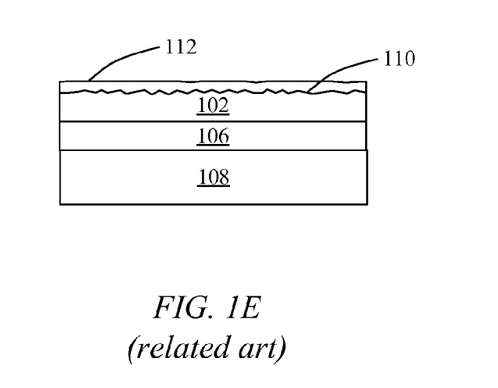

FIGS. 1A-1E show a series of steps representing conventional steps for forming composite fabric configuration. In FIG. 1A a polyurethane layer 102 is formed on release paper 104. Release paper 104 can have a bottom surface with a texturing pattern formed thereon. When polyurethane layer 102 is formed against the texturing pattern of release paper 104, a geometry of the formed polyurethane layer 102 can be complementary to that of the texturing pattern disposed on release paper 104. Polyurethane layer 102 can be cured/solidified by placing polyurethane layer 102 into a heat chamber. Subsequent to the setting, as shown in FIG. 1B, adhesive layer 106 can be applied to polyurethane layer 102. FIG. 1C shows textile layer 108 laminated to adhesive layer 106. FIG. 1D shows how the textured pattern disposed across top surface 110 of polyurethane layer 102 is exposed after release paper 104 is removed. Unfortunately, as described above, topically adding stain resistant layer 112 along top surface 110 of polyurethane layer 102 substantially alters the texturing, as shown in FIG. 1E. Furthermore, if stain resistant layer 112 is not added, the textured pattern of polyurethane layer 102 actually increases a likelihood of contaminate being trapped within the textured surface of polyurethane layer 102.

Figure 2A:
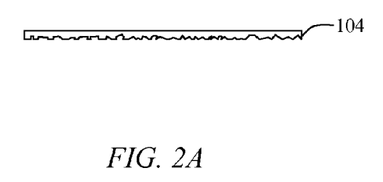
FIGS. 2A-2F show a series of steps for forming a stain proofed polyurethane fabric having a textured outside surface in accordance with the described embodiments.
Figure 2B:
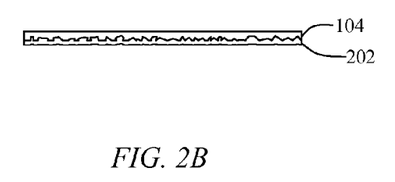
Figure 2C:
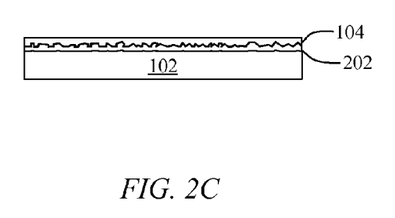
Figure 2D:
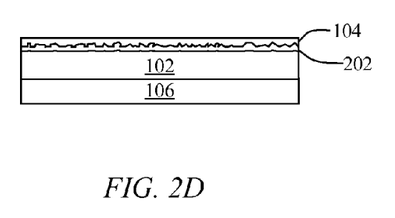
Figure 2E:
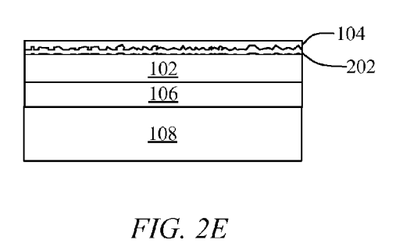
Figure 2F:
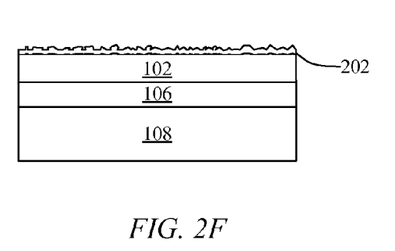

FIGS. 2A-2F show one way to include a stain resistant layer in a piece of fabric while maintaining a desired cosmetic texture. In FIG. 2A, release paper 104 includes a texturing layer disposed along a bottom surface of release paper 104. FIG. 2B shows stain resistant layer 202 formed against release paper 104. When stain resistant layer 202 is formed against release paper 104, it can adopt a textured pattern complementary to a geometry of the texturing layer of release paper 104, as shown in FIG. 2B. In some embodiments, a bottom surface of stain resistant layer 202 can be affected by the texturing pattern of release paper 104. In FIG. 2C, polyurethane layer 102 is shown formed against stain resistant layer 202. A top surface of polyurethane layer 102 can have a geometry in accordance with the bottom surface of stain resistant layer 202. Polyurethane layer 102 can be formed in this depicted configuration using a polyurethane fabric bath. In some embodiments, polyurethane layer 102 can be set/cured against stain resistant layer 202 in a heat chamber. FIG. 2D shows adhesive layer 106 applied to polyurethane layer 102. Adhesive layer 106 can be applied to polyurethane layer 102 in any of a number of ways. For example, adhesive layer 106 can be formed by spreading a predetermined amount of adhesive across the bottom surface of polyurethane layer 102. In this way characteristics of a resulting adhesive bond can be controlled. FIG. 2E shows textile layer 108 laminated to polyurethane layer 102 by adhesive layer 106. When the adhesive forming adhesive layer 106 is pressure sensitive adhesive, this can be accomplished by passing the assembled fabric through a set of rollers. It should be noted that textile layer 108 can be constructed in a variety of ways. For example, textile layer 108 can be woven, knit, knotted, crocheted, or bonded together. In some embodiments, textile layer 108 can have elastic properties allowing the formed fabric to conform to an object to which it is designed to be attached. In one particular embodiment, the textile layer can be an elastic knit backer. Such a configuration can be utilized to form a cosmetic surface of an accessory device such as the Smart Cover® manufactured by Apple Inc. of Cupertino, Calif. In FIG. 2F, release paper 104 is removed from stain resistant layer 202, leaving a textured surface imprinted across an outside surface of stain resistant layer 202. Release paper 104 can include a coating having a chemistry that facilitates easy removal of release paper 104 from stain resistant layer 202. In this way, the resulting fabric can have a desired tactile and visual appearance.

Figure 3A:
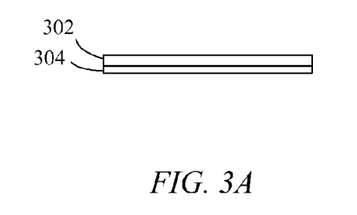
FIGS. 3A-3E show another series of steps for forming a textured, stain proofed polyurethane fabric.
Figure 3B:
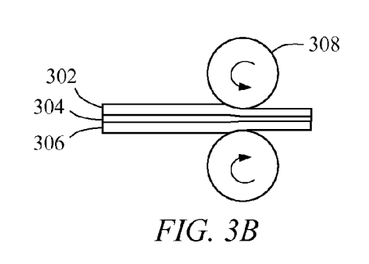
Figure 3C:
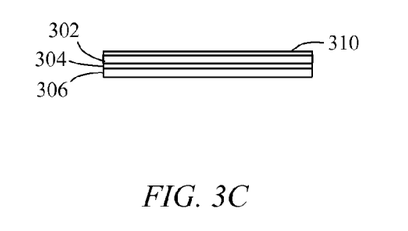
Figure 3D:
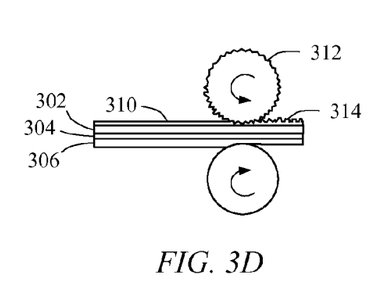
Figure 3E:
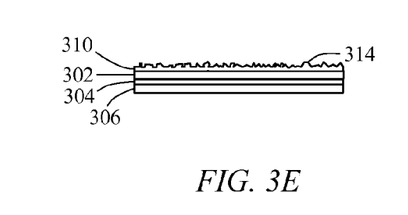

FIGS. 3A-3E illustrate a number of fabric assembly steps for forming a composite layer of fabric 300. FIG. 3A shows polyurethane layer 302 along with an adhesive layer 304 applied to polyurethane layer 302. In some embodiments, adhesive layer 304 can be a type of adhesive that provides structural stability to the fabric once it is cured. In FIG. 3B a textile layer 306 is compressed against adhesive layer 304 by rollers 308, thereby laminating the layers together. When adhesive layer 304 is formed of a pressure sensitive adhesive the roller processing can result in permanent lamination of polyurethane layer 302 to textile layer 306. In some embodiments, the adhesive can require heating and pressure to be fully cured. In other embodiments, a thermosetting adhesive can be used. FIG. 3C shows a stain resistant layer 310 applied to a top surface of the fabric. Stain resistant layer 310 can be applied in a manner so as to leave it malleable for subsequent texturing by mechanism configured to apply a texturing pattern. FIG. 3D shows another roller configuration including an embossing roller 312. Embossing roller 312 applies textured pattern 314 along the top surface of stain resistant layer 310. Finally FIG. 3E depicts a fabric layer with textured pattern 314 disposed across stain resistant layer 310.

Figure 4:
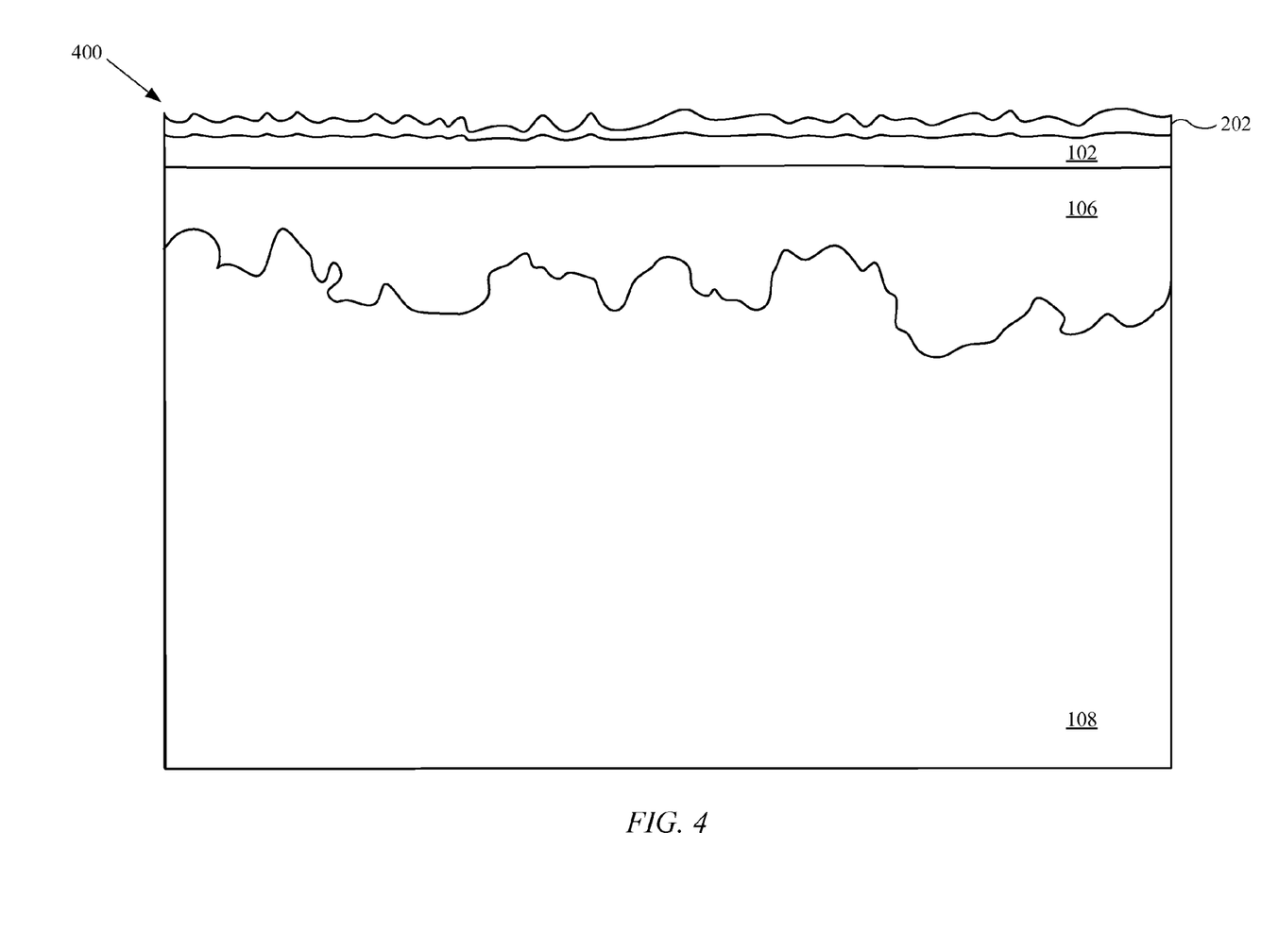
FIG. 4 shows a detailed cross-sectional view of a stain proofed polyurethane fabric in accordance with the described embodiments.

FIG. 4 shows a close up view of a representative layer of fabric 400 formed in accordance with the described embodiments. Stain resistant layer 202 of the fabric is disposed on top and can be formed of a substantially stain resistant material having a thickness of between about 0.01 mm-0.05 mm. In some embodiments, stain resistant layer 202 can include pigments that alter a surface appearance of fabric 400. Polyurethane layer 102 disposed below it can be on the order of 0.02-0.03 mm in thickness. It should be noted that in some embodiments, there could be two polyurethane layers applied in separate steps. Adhesive layer 106 can be between about 0.3-0.4 mm in thickness. Finally textile layer 108 can be in the range of between 0.4 mm-1.0 mm in thickness. FIG. 4 also shows how portions of adhesive layer 106 can intermix with portions of textile substrate 108. It should be noted that in some embodiments fabric 400 can include a knit backer to provide flexibility to the fabric, thereby allowing it to conform to a surface of a given product to which it is to be affixed.

Figure 5:
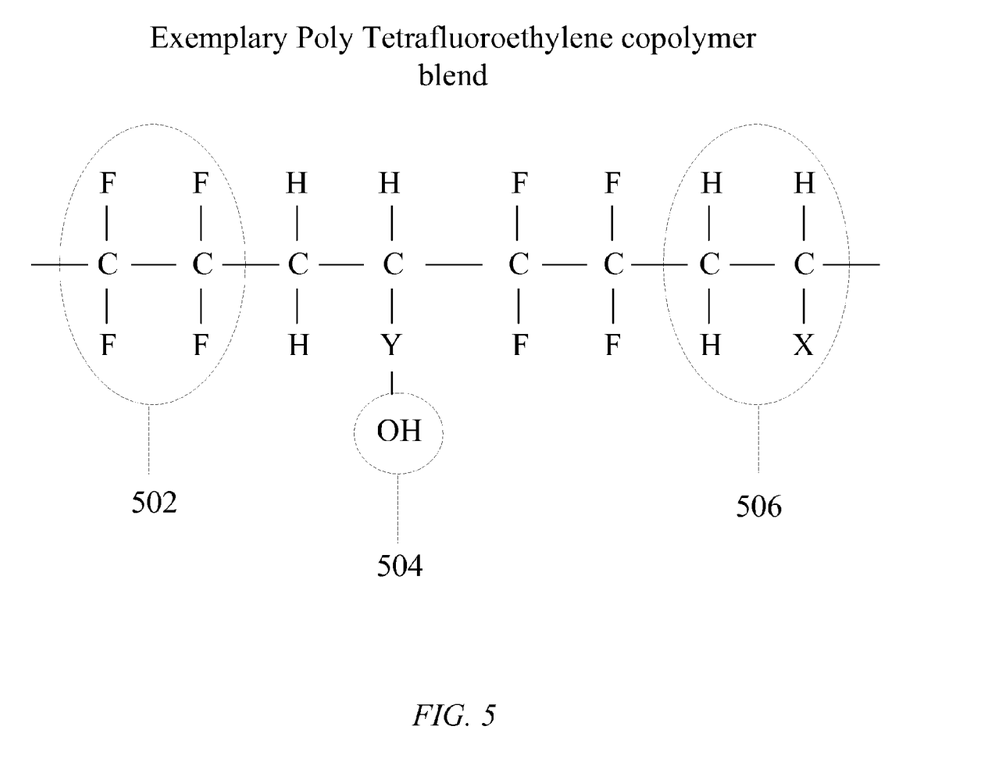
FIG. 5 shows an exemplary molecular structure of a stain resistant resin.

FIG. 5 shows an exemplary configuration of a particular stain release chemistry suitable for forming an anti-stain resistant resin. A poly tetrafluoroethylene (TFE) copolymer blend suitable for use as the aforementioned anti-stain resistant resin is depicted. It should be noted that only a portion of the copolymer is depicted and that the depicted pattern can be repeated numerous times. The copolymer blend can include a number of different groupings of molecules that provide different characteristics that optimize this blend for use with the described embodiments. Stain resistance group 502 formed of a TFE grouping provides robust resistance against bonding of foreign particulates to the stain resistant layer. Cross-linking reaction site 504 includes an OH molecule used to cross-link with other molecules such as other copolymer strands or in some cases pigments. An element or group of elements represented by Y that attaches the cross-linking reaction site to the copolymer can be configured to adjust various characteristics of cross-linking reaction site 504. For example, when Y represents a large or particularly long molecule, a distance between the copolymer and molecules to which it attaches can be extended, allowing for a comparatively looser coupling than would be provided when Y represents a smaller element or molecule. In some embodiments variations in composition of Y can change a viscosity of the anti-stain resistant resin. Also depicted are a number of solubility enabling sites 506. Solubility enabling sites 506 can allow the copolymer blend to achieve a solubility suitable for achieving a desired texture. Solubility enabling sites 506 can also be useful to increase a resistance of the copolymer to hydrolytic attack. The X designator of the depicted solubility enabling site 506 represents an element or group of elements that form another reaction site that enables the copolymer to be bound with water molecules, thereby increasing solubility of the copolymer blend. As stated above, increased solubility can help the copolymer conform to a texturing pattern disposed on the sheet of release paper, as described in previous embodiments. It should be understood that the depicted chemistry is provided for exemplary purposes and should not be construed as limiting. In some embodiments, more traditional anti-stain resistant resins such as silicone or fluoroalkyl C6 chemistries can be used. Furthermore, small changes to the copolymer depicted have also been considered. For example, a frequency of various reaction sites can be increased or decreased to achieve a desired viscosity and solubility of the anti-stain resistant resin. This can allow the stain resistant layer to assume the textured pattern while maintaining desirable stain resistance properties.

Figure 6:
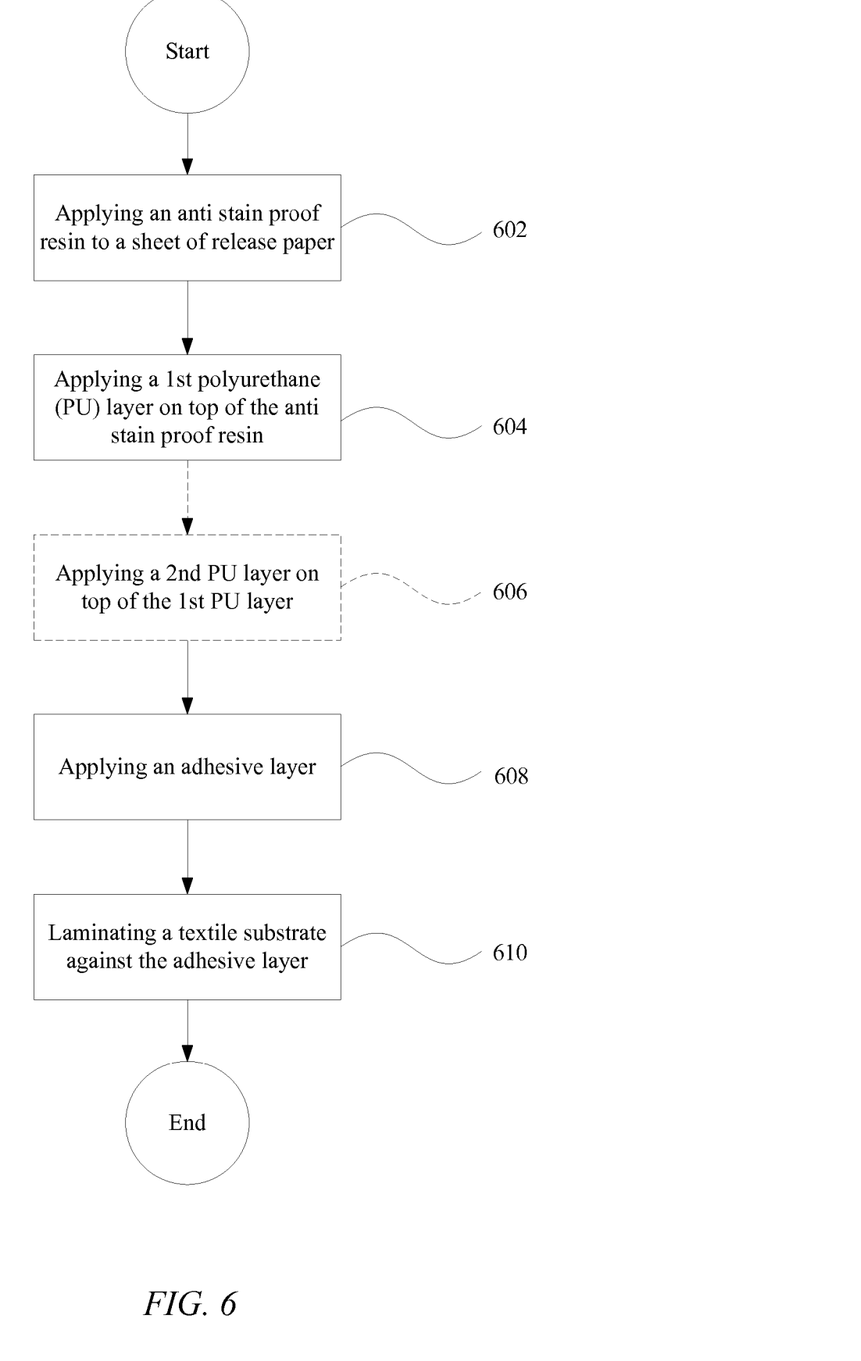
FIG. 6 shows a block diagram depicting a number of steps of a method for forming a polyurethane fabric.

FIG. 6 shows a block diagram 600 illustrating a process for forming a fabric with a textured stain resistant outside surface. At a first step 602, a layer of anti-stain proof resin is applied directly to a sheet of release paper having a desired texturing pattern. The anti-stain proof resin can be applied to the release paper by a liquid bath process sometimes referred to as a fabric bath. Alternatively, in some embodiments, the texturing pattern can be applied to the anti-stain proof resin with an embossing roller. The anti-stain proof resin can be applied in a liquid form having either a transparent or pigmented consistency. The pigmented consistency can be achieved by adding pigmentation to the resin, thereby achieving a specific cosmetic color requirement for the fabric. As the anti-stain proof resin is applied, its chemical composition allows it to fill in the texturing pattern of the release paper while maintaining a desired level of stain resistance. A heat chamber can be utilized to set the anti-stain proof resin into a stain resistant layer. At step 604, a first polyurethane (PU) layer is added on top of the stain proof layer. In one embodiment, the first PU layer can be solidified/cured in a heat chamber. At optional step 606, subsequent to curing the first PU layer, a second PU layer can be applied directly to the first PU layer. At step 608, an adhesive layer is applied. Subsequent to application of the adhesive layer, at step 610, a textile layer is laminated to the adhesive layer. In one embodiment, this laminating can be accomplished by running the assembled fabric through a roller or press.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for forming a polyurethane fabric, comprising:
    forming a stain resistant layer by applying an anti-stain resistant resin to a sheet of release paper, the formed stain resistant layer comprising a first surface and a second surface opposite the first surface, the first surface having a textured pattern corresponding to a texturing pattern of the release paper;
    curing a polyurethane layer against the second surface of the stain resistant layer;
    applying an adhesive layer to the cured polyurethane layer; and
    laminating a textile layer against the adhesive layer.

2. The method as recited in claim 1, wherein the applying an adhesive layer comprises spreading a layer of pressure sensitive adhesive along a surface of the cured polyurethane layer.

3. The method as recited in claim 2, wherein the anti-stain resistant resin has material properties allowing it to conform to the texturing pattern of the sheet of release paper.

4. The method as recited in claim 1, wherein the anti-stain resistant resin comprises a poly tetrafluoroethylene copolymer blend.

5. The method as recited in claim 1, wherein curing the polyurethane layer comprises placing the formed stain resistant layer and polyurethane layer into a heat chamber.

6. The method as recited in claim 1, wherein laminating the textile layer comprises passing the polyurethane fabric through a set of rollers configured to compress the layers together.

7. The method as recited in claim 1, further comprising removing the sheet of release paper from the stain resistant layer,
    wherein the textured pattern of the first surface maintains a geometry complementary to the texturing pattern of the release paper, subsequent to removal of the sheet of release paper.

8. The method as recited in claim 1, wherein applying the adhesive comprises applying a thermosetting adhesive.

9. A method for forming an accessory device, comprising:
    depositing an anti-stain resistant resin against a sheet of release paper;
    solidifying the anti-stain resistant resin to form a stain resistant layer; the stain resistant layer comprising a first surface and a second surface opposite the first surface, the first surface having a textured pattern corresponding to a texturing pattern of the release paper;
    forming a polyurethane layer against the second surface of the stain resistant layer;
    curing the polyurethane layer; and
    laminating a textile layer against the polyurethane layer using an adhesive layer to form a composite fabric.

10. The method as recited in claim 9, wherein curing the polyurethane layer comprises curing the polyurethane layer using a heat chamber.

11. The method as recited in claim 9, further comprising:
    applying another polyurethane layer to the polyurethane layer; and
    curing the other polyurethane layer.

12. The method as recited in claim 9, wherein the adhesive layer provides structural stability to the composite fabric.

13. The method as recited in claim 9, further comprising:
    removing the sheet of release paper from the stain resistant layer.

14. The method as recited in claim 9, further comprising:
    stretching the composite fabric over a substrate defining at least a portion of the accessory device.

* * * * *